United States Patent
Fujii et al.

(10) Patent No.: US 9,067,387 B2
(45) Date of Patent: Jun. 30, 2015

(54) DECORATIVE FILM STRUCTURE AND DECORATIVE MEMBER

(75) Inventors: Takashi Fujii, Hiroshima (JP); Daiji Katsura, Hiroshima (JP); Takakazu Yamane, Hiroshima (JP); Sakura Nakano, Hiroshima (JP); Kenta Okada, Hiroshima (JP)

(73) Assignees: Ishii Hyoki Co., Ltd., Hiroshima (JP); Mazda Motor Corporation, Hiroshima (JP)

(*) Notice: Subject to any disclaimer, the term of this patent is extended or adjusted under 35 U.S.C. 154(b) by 217 days.

(21) Appl. No.: 13/564,632

(22) Filed: Aug. 1, 2012

(65) Prior Publication Data

US 2013/0034692 A1 Feb. 7, 2013

(30) Foreign Application Priority Data

Aug. 3, 2011 (JP) ................. 2011-170172

(51) Int. Cl.
  *B32B 3/00* (2006.01)
  *B32B 27/06* (2006.01)
  (Continued)

(52) U.S. Cl.
  CPC ......... *B32B 27/06* (2013.01); *Y10T 428/24364* (2015.01); *B32B 33/00* (2013.01);
  (Continued)

(58) Field of Classification Search
  CPC ........ B32B 27/06; B32B 33/00; B32B 15/08; B32B 3/10; B32B 3/12; B32B 3/14; B32B 3/18; B32B 3/30; B32B 2605/08; B60R 13/02; B44F 1/02; B44F 1/04; B44F 1/045; C09D 5/03; C09D 5/031; C09D 5/032; C09D 5/28; C09D 5/29; Y10T 428/24364

USPC .................................................. 428/141, 142
See application file for complete search history.

(56) References Cited

U.S. PATENT DOCUMENTS

| 3,661,686 A | 5/1972 | Armstrong |
| 6,190,028 B1 | 2/2001 | Aikawa et al. |

(Continued)

FOREIGN PATENT DOCUMENTS

| CN | 1211587 A | 3/1999 |
| CN | 101332690 A | 12/2008 |

(Continued)

OTHER PUBLICATIONS

English abstract for JP 2004-124219 A. Apr. 22, 2004.*

(Continued)

*Primary Examiner* — Maria Veronica Ewald
*Assistant Examiner* — Nancy Johnson
(74) *Attorney, Agent, or Firm* — Studebaker & Brackett PC

(57) ABSTRACT

A decorative film structure includes: a surface layer constituted by a transparent or translucent resin layer; an achromatic layer constituted by dots provided on a back surface of the surface layer; and a metal luster layer provided on the back surface of the surface layer to fill a gap between the dots. As surface roughness of a front surface of the surface layer, an Ra is 2 µm or less and either an Rmax is 4 µm or less or a Sm is 50 µm or more. A lightness L* of the achromatic layer is 0-80. An area of each dot when viewed from a front side of the surface layer is $10^{-3}$-$10^5$ µm². A dot area percentage per a unit area when viewed from the front side of the surface layer is 1-80%. A stimulus value Y45° of the metal luster layer is 10000 or more.

14 Claims, 1 Drawing Sheet

(51) Int. Cl.
  *B32B 33/00* (2006.01)
  *B44C 5/04* (2006.01)
  *B44F 1/04* (2006.01)
  *B60R 13/02* (2006.01)
  *B32B 38/00* (2006.01)

(52) U.S. Cl.
  CPC .. *B44C 5/04* (2013.01); *B44F 1/04* (2013.01); *B32B 2038/0092* (2013.01); *B32B 2309/105* (2013.01); *B32B 2605/08* (2013.01); *B60R 13/02* (2013.01)

(56) References Cited

U.S. PATENT DOCUMENTS

| | | | |
|---|---|---|---|
| 2004/0093730 A1 | 5/2004 | Miya et al. | |
| 2007/0026197 A1* | 2/2007 | Suga et al. | 428/172 |
| 2008/0070013 A1 | 3/2008 | Suga et al. | |
| 2010/0166997 A1* | 7/2010 | Chisaka et al. | 428/40.1 |

FOREIGN PATENT DOCUMENTS

| | | | |
|---|---|---|---|
| DE | 1 646 230 A1 | | 7/1971 |
| DE | 10 2009 051 272 A1 | | 5/2011 |
| EP | 1 216 847 A2 | | 6/2002 |
| JP | 2000-231849 A | | 8/2000 |
| JP | 2001-146096 A | | 5/2001 |
| JP | 2002-210907 A | | 7/2002 |
| JP | 2003-103699 A | | 4/2003 |
| JP | 2004124219 A | * | 4/2004 |
| JP | 2007-030238 A | | 2/2007 |
| JP | 2009-083183 A | | 4/2009 |
| WO | 2006/035901 A1 | | 4/2006 |

OTHER PUBLICATIONS

An Office Action; "Notice of Reasons for Rejection," issued by the Japanese Patent Office on Feb. 3, 2015, which corresponds to Japanese Patent Application No. 2011-170172 and is related to U.S. Appl. No. 13/564,632; with English language translation.

* cited by examiner

DECORATIVE FILM STRUCTURE AND DECORATIVE MEMBER

CROSS-REFERENCE TO RELATED APPLICATION

This application claims priority to Japanese Patent Application No. 2011-170172 filed on Aug. 3, 2011, the disclosure of which including the specification, the drawings, and the claims is hereby incorporated by reference in its entirety.

BACKGROUND

The present disclosure relates to decorative film structures and decorative members which can be used for interior parts of automobiles, for example.

Automobile interior parts such as door handles are sometimes required to have metallic design for adding a high quality appearance. As such a metallic design, glossy chromium plating and satin plating having an appearance of oxidized silver are known, for example. However, the chromium plating is too specular to match atmospheres in some automobile interiors. The satin plating has a quiet texture, but needs to be formed through complicated processes.

For this reason, there has been a demand for a technique that can easily achieve a polished-metallic surface design which is not excessively specular and shines softly. Japanese Patent Publication No. 2009-83183 proposes an optical thin-film laminated structure in which an optical thin film including a light absorption layer made of a high-refractive-index thin layer, a low-refractive-index thin layer, and/or a pure metal thin layer is provided on the surface of a base material so that the light absorption layer has a metallic luster with a sufficiently high reflection lightness and a sufficiently high chromaticness. This technique, however, imparts a metallic luster with a high reflection lightness to the base material, and does not impart a polished-metallic surface design with a diminished luster to the base material.

SUMMARY

To achieve a polished-metallic surface design which is not excessively specular and shines softly, it is sufficient to obtain a decorative film structure having optical properties similar to those of a polished metal surface and having an appearance with a polished-metallic surface design. For example, the decorative film structure can be easily obtained by forming multiple layers on a base material of a transfer film by painting, coating, or other techniques. Alternatively, the decorative film structure can also be easily obtained by forming multiple layers on a clear film to serve as the surface layer of the decorative film structure by painting, coating, or other techniques. The obtained decorative film structure is transferred or adhered onto the surface of the base material, thereby easily decorating the surface of the base material with a polished-metallic surface design. Alternatively, layers of the decorative film structure may be directly formed on the surface of the base material by printing, coating, or other techniques.

It is therefore an object of the present disclosure to provide a decorative film structure having optical properties similar to those of a polished metal surface and having an appearance with a polished-metallic surface design and a decorative member using the decorative film structure so as to easily achieve a polished-metallic surface design which is not excessively specular and shines softly.

To achieve the object, a first or a second decorative film structure as described below is provided.

The first decorative film structure includes: a surface layer constituted by a transparent or translucent resin layer; an achromatic layer constituted by a plurality of dots provided on a back surface of the surface layer; and a metal luster layer provided on the back surface of the surface layer to fill a gap between the dots of the achromatic layer. As surface roughness of the front surface of the surface layer, an arithmetic average roughness Ra is 2 μm or less and either a maximum height Rmax is 4 μm or less or an average concave to convex distance Sm is 50 μm or more. A lightness $L^*$ of the achromatic layer in an $L^*a^*b^*$ colorimetric system is 0-80. An area of each of the dots when viewed from a front side of the surface layer is $10^{-3}$-$10^5$ μm². A dot area percentage per a unit area when viewed from the front side of the surface layer is 1-80%. A stimulus value Y45° of the metal luster layer is 10000 or more. The stimulus value Y45° of the metal luster layer is a value of Y in tristimulus values of color of an object due to reflection in an XYZ colorimetric system in a case where an illumination optical axis angle is −45°±2° with respect to a direction normal to the front surface of the metal luster layer and a received reflected light optical axis angle is 45°±2° with respect to a direction normal to the front surface of the metal luster layer.

In the above-mentioned configuration, light entering the decorative film structure from the side of the surface layer partially causes diffuse reflection due to the surface roughness of the front surface of the surface layer, is partially absorbed in the dots of the achromatic layer on the back surface of the surface layer, and partially causes specular reflection (mirror reflection) by the metal luster layer on the back surface of the surface layer. In addition, part of the light also causes diffuse reflection on the peripheries of the dots of the achromatic layer. The interaction of these light diffuse reflection, light absorption, and specular reflection causes the decorative film structure to have optical properties similar to those of a polished metal surface and an appearance with a polished-metallic surface design, thereby easily achieving a polished-metallic surface design which is not excessively specular and shines softly.

Specifically, as the surface roughness of the front surface of the surface layer, the arithmetic average roughness Ra is 2 μm or less, thereby ensuring diffuse reflection sufficient for achieving a polished-metallic surface design. Adjustment of the maximum height Rmax to 4 μm or less or the average concave to convex distance Sm to 50 μm or more can also ensure diffuse reflection sufficient for achieving a polished-metallic surface design.

The lightness $L^*$ of the achromatic layer in the $L^*a^*b^*$ colorimetric system (CIE 1976) may be adjusted to 80 or less. This adjustment can ensure light absorption sufficient for achieving a polished-metallic surface design which is not excessively specular and shines softly.

In addition, the area of each of the dots when viewed from the front side of the surface layer may be adjusted to $10^{-3}$ μm² or more. This adjustment can prevent excessive reduction of the dot size and ensure light absorption in the dots. On the other hand, the area of each of the dots when viewed from the front side of the surface layer may be adjusted to $10^5$ μm² or less. This adjustment can increase the number of dots per a unit area with the same dot area percentage (the ratio of the total area of all the dots in the unit area to the unit area) when viewed from the front side of the surface layer. Thus, the total peripheral length of all the dot in the unit area increases, thereby ensuring diffuse reflection on the peripheries of the dots. In addition, it is possible to suppress excessive increase of the dot size, thus reducing degradation of appearance of the decorative film structure.

Furthermore, the dot area percentage per a unit area when viewed from the front side of the surface layer may be adjusted to 1% or more. This adjustment can ensure light absorption sufficient for achieving a polished-metallic surface design which is not excessively specular and shines softly. On the other hand, the dot area percentage per a unit area when viewed from the front side of the surface layer may be adjusted to 80% or less. This adjustment can reduce excessive light absorption and also reduce excessive decrease in the lightness and/or the stimulus value of the decorative film structure.

The stimulus value Y45° of metal luster layer may be adjusted to 10000 or more. This adjustment can ensure specular reflection (i.e., a metallic luster) sufficient for achieving a polished-metallic surface design.

The second decorative film structure includes: a surface layer constituted by a transparent or translucent resin layer; an achromatic layer constituted by a plurality of dots provided on a front surface of the surface layer; and a metal luster layer provided on a back surface of the surface layer. As surface roughness of the front surface of the surface layer, an arithmetic average roughness Ra is 2 μm or less and either a maximum height Rmax is 4 μm or less or an average concave to convex distance Sm is 50 μm or more. A lightness L* of the achromatic layer in an L*a*b* colorimetric system is 0-80. An area of each of the dots when viewed from a front side of the surface layer is $10^{-3}$-$10^5$ μm$^2$. A dot area percentage per a unit area when viewed from the front side of the surface layer is 1-80%. A stimulus value Y45° of the metal luster layer is 10000 or more. The stimulus value Y45° of the metal luster layer is a value of Y in tristimulus values of color of an object due to reflection in an XYZ colorimetric system in a case where an illumination optical axis angle is −45°±2° with respect to a direction normal to the front surface of the metal luster layer and a received reflected light optical axis angle is 45°±2° with respect to a direction normal to the front surface of the metal luster layer.

In the above-mentioned configuration, light entering the decorative film structure from the side of the surface layer partially causes diffuse reflection due to the surface roughness of the front surface of the surface layer, is partially absorbed in the dots of the achromatic layer on the front surface of the surface layer, and partially causes specular reflection (mirror reflection) by the metal luster layer on the back surface of the surface layer. In addition, part of the light also causes diffuse reflection on the peripheries of the dots of the achromatic layer. In the same manner as the first decorative film structure, the interaction of these light diffuse reflection, light absorption, and specular reflection causes the decorative film structure to have optical properties similar to those of a polished metal surface and an appearance with a polished-metallic surface design, thereby easily achieving a polished-metallic surface design which is not excessively specular and shines softly.

In the first and second decorative film structures, preferably, as the surface roughness of the front surface of the surface layer, the Ra is 1 μm or less and either the Rmax is 2 μm or less or the Sm is 100 μm or more.

This configuration can further ensure diffuse reflection sufficient for achieving a polished-metallic surface design.

In the first and second decorative film structures, the lightness L* of the achromatic layer is preferably 0-50.

This configuration can further ensure light absorption sufficient for achieving a polished-metallic surface design which is not excessively specular and shines softly.

In the first and second decorative film structures, the dot area percentage per the unit area when viewed from the front side of the surface layer is preferably 1-60%.

This configuration can reduce excessive light absorption and also reduce excessive decrease in the lightness and/or the stimulus value of the decorative film structure.

In the first and second decorative film structures, the stimulus value Y45° of the metal luster layer is preferably 20000 or more.

This configuration can further ensure specular reflection (metallic luster) sufficient for achieving a polished-metallic surface design.

The first or second decorative film structure may be provided on a surface of a base material, thereby obtaining a decorative member including the base material and a decorative film structure provided on the surface of the base material.

This configuration allows the decorative member to easily have optical properties similar to those of a polished metal surface and an appearance with a polished-metallic surface design.

In the decorative member, the base material is preferably a resin-molded member.

This configuration can enhance the flexibility in designing the shape of the decorative member.

DETAILED DESCRIPTION

Examples embodiments of the present disclosure will be described in detail hereinafter.

The inventors of the present invention conducted various investigations to achieve a polished-metallic surface design which is not excessively specular and shines softly by employing a decorative film structure as a stack of a plurality of layers. As a result of the investigations, the inventors focused on the fact that diffuse reflection, light absorption, and specular reflection (mirror reflection) of light incident on the decorative film structure are important factors for achieving a polished-metallic surface design. The inventors also found that diffuse reflection can be reproduced by adjusting the surface roughness of the surface layer of the decorative film structure, light absorption can be reproduced by using an achromatic layer having a relatively low lightness, and specular reflection can be reproduced by using a metal luster layer with a metallic luster having a relatively large stimulus value. The inventors also found that, when the achromatic layer is constituted by dots as will be described later, diffuse reflection can also be reproduced by using the peripheries of the dots of the achromatic layer.

However, even when the surface layer is made transparent or translucent, it is difficult to obtain an appearance achieving light diffuse reflection, light absorption, and specular reflection by merely laminating the achromatic layer and the metal luster layer. For example, if the metal luster layer is disposed under the achromatic layer, the metal luster layer hidden by the achromatic layer and is difficult to be seen. Thus, in this case, it is difficult to achieve light specular reflection (i.e., metallic luster). In contrast, if the achromatic layer is disposed under the metal luster layer, the achromatic layer is hidden by the metal luster layer and is difficult to be seen. Thus, in this case, it is difficult to achieve light absorption.

To solve the foregoing problems, the inventors have devised a configuration in which an achromatic layer is constituted by a plurality of dots such that a metal luster layer can be seen through gaps between the dots. The present disclosure has been made based on the foregoing findings and ideas.

Figure 1:
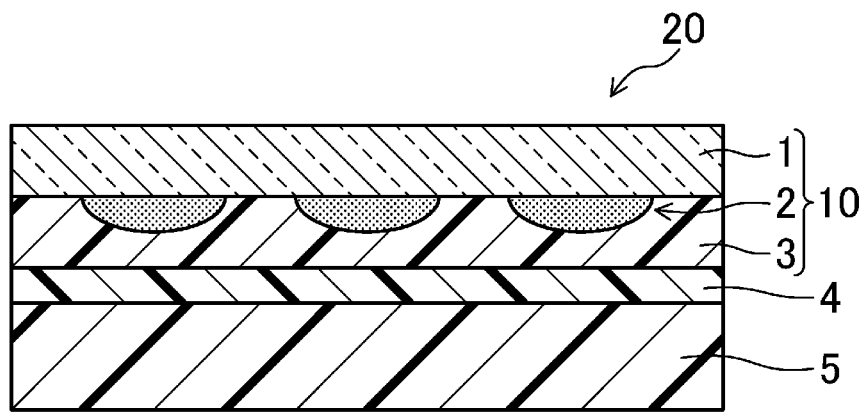
FIG. 1 is a longitudinal sectional view illustrating layered configurations of a decorative film structure and a decorative member including the decorative film structure according to a first example embodiment.

FIG. 1 illustrates a decorative film structure 10 according to a first example embodiment. This decorative film structure 10 includes: a surface layer 1 constituted by a transparent or translucent resin layer; an achromatic layer 2 disposed on the back surface (the lower side) of the surface layer 1 and constituted by a plurality of dots (minute dots); and a metal luster layer 3 disposed on the back surface (the lower side) of the surface layer 1 to fill the gaps between the dots of the achromatic layer 2 and covering the back surface (the lower side) of the achromatic layer 2. In the first example embodiment, the surface layer 1 has a diffuse reflection function, the achromatic layer 2 has a light absorption function and a diffuse reflection function, and the metal luster layer 3 has a specular reflection function.

In the decorative film structure 10, portions of the metal luster layer 3 are located in the gaps between the dots of the achromatic layer 2, resulting in that the metal luster layer 3 can be seen through the gaps between the dots when viewed from the front side of the surface layer 1 (in plan view). Accordingly, when the decorative film structure 10 is viewed from the side of the surface layer 1 with the diffuse reflection function, minute dots of the achromatic layer 2 with the light absorption function are dispersed in the metal luster layer 3 with the specular reflection function.

In the above-mentioned configuration, light entering the decorative film structure 10 from the side of the surface layer 1 partially causes diffuse reflection due to the surface roughness of the front surface of the surface layer 1, is partially absorbed in the dots of the achromatic layer 2 on the back surface of the surface layer 1, partially causes diffuse reflection on the peripheries of the dots, and partially causes specular reflection (mirror reflection) by the metal luster layer 3 on the back surface of the surface layer 1. The interaction of these light diffuse reflection, light absorption, and specular reflection causes the decorative film structure 10 to have optical properties similar to those of a polished metal surface and an appearance with a polished-metallic surface design, thereby achieving a polished-metallic surface design which is not excessively specular and shines softly.

In the decorative film structure 10 illustrated in FIG. 1, the metal luster layer 3 is also disposed on the back surfaces of the dots of the achromatic layer 2, and is present in the gaps between the dots of the achromatic layer 2. However, the present disclosure is not limited to this example. Alternatively, a configuration in which the metal luster layer 3 is not disposed on the back surfaces of the dots of the achromatic layer 2 and is present only in the gaps between the dots of the achromatic layer 2 on the back surface of the surface layer 1, may be employed.

Figure 2:
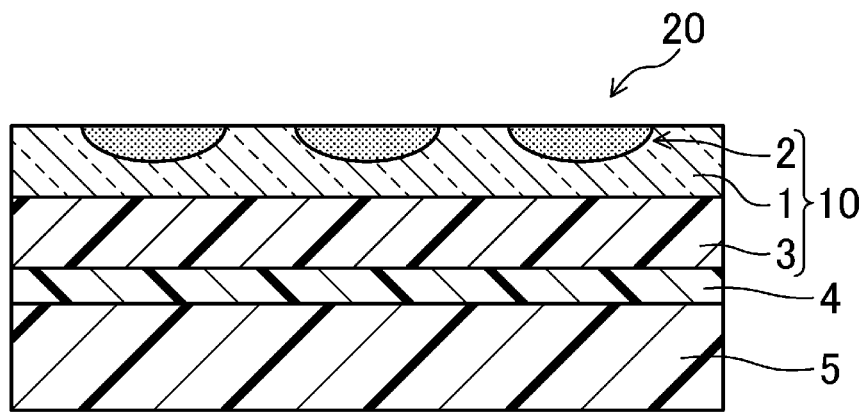
FIG. 2 is a longitudinal sectional view illustrating layered configurations of a decorative film structure and a decorative member including the decorative film structure according to a second example embodiment.

FIG. 2 illustrates a decorative film structure 10 according to a second example embodiment. This decorative film structure 10 includes: a surface layer 1 constituted by a transparent or translucent resin layer; an achromatic layer 2 constituted by a plurality of dots (minute dots) provided on the front surface (in a surface portion at the front side) of the surface layer 1; and a metal luster layer 3 disposed on the back surface of the surface layer 1. The front surface of the achromatic layer 2 is flush with the front surface of the surface layer 1. In the second example embodiment, the surface layer 1 has a diffuse reflection function, the achromatic layer 2 has a light absorption function and a diffuse reflection function, and the metal luster layer 3 has a specular reflection function.

In the decorative film structure 10 illustrated in FIG. 2, the metal luster layer 3 is disposed at the back of the achromatic layer 2, resulting in that the metal luster layer 3 can be seen through the gaps between the dots when viewed from the front side of the surface layer 1. Accordingly, when the decorative film structure 10 is viewed from the side of the surface layer 1 with the diffuse reflection function, minute dots of the achromatic layer 2 with the light absorption function are dispersed in the metal luster layer 3 with the specular reflection function.

In the above-mentioned configuration, light entering the decorative film structure 10 from the side of the surface layer 1 partially causes diffuse reflection due to the surface roughness of the front surface of the surface layer 1, is partially absorbed in the dots of the achromatic layer 2 in the front surface of the surface layer 1, partially causes diffuse reflection on the peripheries of the dots, and partially causes specular reflection (mirror reflection) by the metal luster layer 3 on the back surface of the surface layer 1. The interaction of these light diffuse reflection, light absorption, and specular reflection causes the decorative film structure 10 to have optical properties similar to those of a polished metal surface and an appearance with a polished-metallic surface design, thereby achieving a polished-metallic surface design which is not excessively specular and shines softly.

In the first and second example embodiments, the diffuse reflection function refers to the function of reflecting 20% or more of the intensity of visible light (wavelength: 420-670 nm, angle of divergence: substantially zero degrees) externally incident at an incident angle of 45°, toward directions except for directions within a specular reflection angle of ±3°, in reflecting the visible light, or the function of changing the direction of 5% or more of the transmitted light intensity of visible light (wavelength: 380-780 nm, angle of divergence: substantially zero degrees) externally incident at an incident angle of 90°, toward directions except for the directions within a specular transmission angle of ±3°, in transmitting the visible light.

In the first and second example embodiments, the light absorption function refers to the function of absorbing or transmitting 20% or more of the intensity of visible light (wavelength: 420-670 nm, angle of divergence: substantially zero degrees) externally incident at an incident angle of 90°. In reflecting the incident visible light, the difference in reflection factor between the wavelengths (420-670 nm) is preferably within ±10%.

In the first and second example embodiments, the specular reflection function refers to the function of reflecting 90% or more of the reflected light intensity of visible light (wavelength: 420-670 nm, angle of divergence: substantially zero degrees) externally incident at an incident angle of 45°, toward directions within a specular reflection angle of ±3°, in reflecting the visible light.

In the first and second example embodiments, the surface roughness (specifically, an arithmetic average roughness Ra, a maximum height Rmax, and an average concave to convex distance Sm) of the front surface of the surface layer 1, the lightness L* of the achromatic layer 2, which will be described later, the area of each dot of the achromatic layer 2 when viewed from the front side of the surface layer 1, the dot area percentage per a unit area (i.e., the ratio of the total area of all the dots per a unit area to the unit area, hereinafter referred to as a dot area percentage) when viewed from the front side of the surface layer 1, and the stimulus value Y45° of the metal luster layer 3, which will be described later, are adjusted, thereby adjusting the degree of light diffuse reflection, the degree of light specular reflection, and the degree of light absorption to desired values independently of each other in the decorative film structure 10.

In the first and second example embodiments, as the surface roughness of the front surface of the surface layer 1, the arithmetic average roughness Ra is 2 μm or less, and either the maximum height Rmax is 4 μm or less or the average concave to convex distance Sm is 50 μm or more. Adjustment of the arithmetic average roughness Ra to 2 μm or less can ensure diffuse reflection sufficient for achieving a polished-metallic surface design. Adjustment of the maximum height Rmax to 4 μm or less or the average concave to convex distance Sm to 50 μm or more can also ensure diffuse reflection sufficient for achieving a polished-metallic surface design.

As the surface roughness of the front surface of the surface layer 1, it is more preferable that the Ra is 1 μm or less and either the Rmax is 2 μm or less or the Sm is 100 μm or more. This adjustment further can ensure diffuse reflection sufficient for achieving a polished-metallic surface design.

In the first and second example embodiments, the lightness L* of the achromatic layer 2 in an L*a*b* colorimetric system (CIE 1976) is 0-80. Adjustment of the lightness L* of the achromatic layer 2 to 80 or less can ensure light absorption sufficient for achieving a polished-metallic surface design which is not excessively specular and shines softly. The lightness L* of the achromatic layer 2 is preferably adjusted to 0-50. This adjustment can further ensure light absorption sufficient for achieving a polished-metallic surface design which is not excessively specular and shines softly.

In the first and second example embodiments, the area of each dot when viewed from the front side of the surface layer 1 is $10^{-3}$-$10^5$ $\mu m^2$. Adjustment of the area of each dot to $10^{-3}$ $\mu m^2$ or more can prevent excessive reduction of the dot size and ensure light absorption in the dots. On the other hand, adjustment of the area of each dot to $10^5$ $\mu m^2$ or less increases the number of dots per a unit area with the same dot area percentage. Thus, the total peripheral length of all the dot in the unit area increases, thereby ensuring diffuse reflection on the peripheries of the dots. In addition, it is possible to suppress excessive increase of the dot size, thus reducing degradation of appearance of the decorative film structure 10.

In the first and second example embodiments, the dot area percentage is 1-80%. Adjustment of the dot area percentage to 1% or more can ensure light absorption sufficient for achieving a polished-metallic surface design which is not excessively specular and shines softly. Adjustment of the dot area percentage to 80% or less can reduce excessive light absorption and also reduce excessive decrease in the lightness and/or the stimulus value of the decorative film structure 10.

The dot area percentage of the achromatic layer 2 is more preferably 1-60%. This adjustment can reduce excessive light absorption, and further reduce excessive decrease in the lightness and/or the stimulus value of the decorative film structure 10.

In the first and second example embodiments, the stimulus value Y45° of the metal luster layer 3, which is the value of Y in tristimulus values (X, Y, and Z) of color of an object in an XYZ colorimetric system (CIE 1931 colorimetric system) in a case where the illumination optical axis angle is −45°±2° and the received reflected light optical axis angle is 45°±2° with respect to a direction normal to the front surface of the metal luster layer, is 10000 or more. The adjustment of the stimulus value Y45° of the metal luster layer 3 to 10000 or more can ensure specular reflection (metallic luster) sufficient for achieving a polished-metallic surface design.

The stimulus value Y45° of the metal luster layer 3 is more preferably adjusted to 20000 or more. This adjustment can further ensure specular reflection (metallic luster) sufficient for achieving a polished-metallic surface design.

In the first and second example embodiments, the thicknesses of the surface layer 1, the achromatic layer 2, and the metal luster layer 3 are not specifically limited. The thickness of each layer can be within the range from 1 μm to 1 mm, for example, as necessary.

The surface layer 1 may be colorless or colored as long as the surface layer 1 is transparent or translucent. Adjustment of color of the surface layer 1 makes it possible to select a desired type of a metal (e.g., aluminium) for a polished-metallic surface design of the decorative film structure 10.

The material for the achromatic layer 2 is not specifically limited. The material for the achromatic layer 2 is preferably a resin or a metal, but may be paper or other fibrous materials, or a mineral or other inorganic materials, as necessary.

The material for the metal luster layer 3 is not specifically limited, either, and is preferably a resin or a metal, for example. Adjustment of color of the metal luster layer 3 makes it possible to select a desired type of a metal (e.g., aluminium) for a polished-metallic surface design of the decorative film structure 10.

In the first and second example embodiments, the decorative film structure 10 can be easily obtained by forming the layers 1-3 on a base material (not shown) of a transfer film by printing, coating, or other techniques. Alternatively, the decorative film structure 10 can also be easily obtained by forming the achromatic layer 2 and the metal luster layer 3 on a clear film to be a surface layer 1 of the decorative film structure 10 by printing, coating, or other techniques. Then, the obtained decorative film structure 10 is transferred or adhered, for example, to the surface of a base material 5 (see, FIGS. 1 and 2), thereby easily providing the base material 5 with a polished-metallic surface. Alternatively, the layers 1-3 of the decorative film structure 10 may be directly formed on the surface of the base material 5 by printing, coating, or other techniques.

In the foregoing manner, a decorative member 20 including the base material 5 and the decorative film structure 10 provided on the surface of the base material 5 is obtained. This decorative member 20 has optical properties similar to those of a polished metal surface, and an appearance with a polished-metallic surface design. The decorative member 20 can be preferably used for automobile interior parts such as door handles, and parts of household appliances, personal computers, cellular phones, office suppliers, sporting goods, measurement equipment, sundry goods, and so on.

The base material 5 is preferably a resin-molded member. This is because the flexibility in designing the shape of the decorative member 20 having optical properties similar to those of a polished metal surface and an appearance with a polished-metallic surface design can be enhanced.

In FIGS. 1 and 2, reference character 4 denotes a backing layer for pushing the metal luster layer 3 against the surface layer 1 and/or an adhesive layer for causing the decorative film structure 10 to adhere to the base material 5. A protective layer (not shown) for preventing the metal luster layer 3 from being eroded or corroded by the backing layer (and/or the adhesive layer) 4 may be provided between the metal luster layer 3 and the backing layer (and/or the adhesive layer) 4.

The present disclosure is not limited to the foregoing example embodiments, and various changes and modifications may be made without departing from the scope of the claims.

For example, a transparent or translucent, colorless or colored protective layer may be provided on the front surface of the decorative film structure 10 or the front surface of the decorative member 20 without impairing advantages of the present disclosure. This protective layer can be directly on the front surface of the surface layer 1, for example. The protective layer is intended to protect the front surface of the decorative film structure 10 or the decorative member 20. Alternatively, the protective layer may be intended to adjust the surface roughness (Ra, Rmax, and Sm) of the front surface of the surface layer 1. Accordingly, the surface roughness (Ra, Rmax, and Sm) of the front surface of the surface layer 1 includes the surface roughness (Ra, Rmax, and Sm) adjusted by using the protective layer.

The example embodiments described above are provided by way of illustration only and should not be construed to limit the invention. The scope of the invention should be measured solely by reference to the claims. All the modifications and changes within an equivalent scope of the claims fall within the scope of the invention.

The present disclosure will be described more specifically hereinafter through examples. However, the present disclosure is not limited to the following examples.

[Formation of Decorative Film Structure]
(Test Numbers 1-10 and 12-14)

Decorative film structures each having a configuration similar to that of the decorative film structure 10 illustrated in FIG. 1 were formed to meet the specifications shown in Tables 1 and 2. In Tables 1 and 2, the "average area" in the field of "dot size of achromatic layer" is an average area of the dots of an achromatic layer when viewed from the front side of a surface layer, the "area percentage (%)" in the field of the "dot area percentage of achromatic layer" is the ratio of a dot area per a unit area when viewed from the front side of the surface layer.

Each of the above-mentioned decorative film structures was formed in the following manner. Using a polycarbonate sheet "PC1151" (sheet thickness: 0.5 mm) produced by TEIJIN CHEMICALS LTD.) as a surface layer, an achromatic layer (thickness: 3 μm) in the form of dots was formed by screen printing on this surface layer. The formation of the achromatic layer employed an UV ink "HUG" produced by Seiko advance Ltd. Then, a metal luster layer (with a thickness of 2 μm on the achromatic layer) was formed by screen printing on the surface layer and the achromatic layer. The formation of the metal luster layer employed an ink "MIR-51000 Mirror Silver" produced by Teikoku Printing Inks Mfg Co., LTD. Thereafter, a backing layer (thickness: 10 μm) was formed by screen printing on the metal luster layer. The formation of the backing layer employed an ink "MIB-611 White" produced by Teikoku Printing Inks Mfg Co., LTD. In this manner, a decorative film structure having an appearance of a polished-like surface of aluminium when viewed from the side of the surface layer was obtained.

(Test Number 11)

A decorative film structure was formed in the same manner as those of test numbers 1-10 and 12-14 with the exception that no achromatic layer was formed. The decorative film structure of test number 11 is different from those of the present disclosure.

(Test Numbers 16 and 17)

A decorative film structure was formed in the same manner as those of test numbers 1-10 and 12-14 with the exception that a high-luminance silver ink produced by Nippon Bee Chemical Co., LTD. was used in the formation of a metal luster layer. This decorative film structure is similar to those of test numbers 1-10 and 12-14.

(Test Number 15)

A decorative film structure was formed in the same manner as those of test numbers 16 and 17 with the exception that no achromatic layer was formed. The decorative film structure of test number 15 was different from those of the present disclosure.

[Appearance Evaluation of Decorative Film Structure]

The appearance of each of the decorative film structures formed in the foregoing manner was optically evaluated. Specifically, the decorative film structure was irradiated with visible light (wavelength: 420-670 nm, angle of divergence: substantially zero degrees) at an incident angle of 45° from the side of the surface layer. Then, the stimulus value Y at the specular reflection angle, i.e., the stimulus value Y45° of specular reflection (mirror reflection), and the stimulus value Y which is at −5° from the specular reflection angle, i.e., the stimulus value Y40° of diffuse reflection, were measured with a multi-angle spectrophotometer. The measurement results are shown in Tables 1 and 2.

Here, the stimulus value Y45° of specular reflection is the value of Y in tristimulus values of color of an object due to reflection in an XYZ colorimetric system in a case where the illumination optical axis angle is −45°±2° and the received reflected light optical axis angle is 45°±2° with respect to a direction normal to a sample surface (i.e., the front surface of the surface layer). The stimulus value Y40° of diffuse reflection is the value of Y in tristimulus values of color of an object due to reflection in an XYZ colorimetric system in a case where the illumination optical axis angle is −45°±2° and the received reflected light optical axis angle is 40°±2° with respect to a direction normal to a sample surface (i.e., the front surface of the surface layer).

For comparison, the stimulus value Y45° of specular reflection and the stimulus value Y40° of diffuse reflection of a real polished surface of aluminium and satin plating (satin nickel plating) were measured in the same manner. Then, the stimulus value Y45° of specular reflection on the aluminium polished surface was 35000-55000 (e.g., 38306), the stimulus value Y40° of diffuse reflection was 900-1300 (e.g., 925), the stimulus value Y45° of specular reflection on satin plating was 10000-75000 (e.g., 31977), and the stimulus value Y40° of diffuse reflection was 900-2600 (e.g., 1784). In addition, the ratio of the diffuse reflection stimulus value Y40° to the specular reflection stimulus value Y45° on the aluminium polished surface (Y40°/Y45°) was 0.016-0.037 (e.g., 0.024), and the ratio of the diffuse reflection stimulus value Y40° to the specular reflection stimulus value Y45° on satin plating (Y40°/Y45°) was 0.012-0.26 (e.g., 0.056).

As compared to the decorative film structures of test numbers 11 and 15 where no achromatic layer was formed, the decorative film structures of test numbers 1-10, 12-14, 16, and 17 showed that the specular reflection stimulus value Y45°, the diffuse reflection stimulus value Y40°, and/or the ratio of the diffuse reflection stimulus value Y40° to the specular reflection stimulus value Y45° (Y40°/Y45°) were close to those of the real aluminium polished surface.

The ratio of the diffuse reflection stimulus value Y40° to the specular reflection stimulus value Y45° (Y40°/Y45°) is preferably in the range from 0.007 to 0.25, both inclusive, more preferably in the range from 0.008 to 0.13, both inclusive, and much more preferably in the range from 0.01 to 0.06, both inclusive. If the ratio is too small, the luster tends to be too strong to achieve a texture which shines softly. On the other hand, if the ratio is too large, the luster tends to be too weak with a texture which shines excessively softly.

The specular reflection stimulus value Y45° is preferably in the range from 4000 to 100000, both inclusive, more preferably in the range from 7000 to 75000, both inclusive, and much more preferably 10000 to 50000, both inclusive. If the ratio is too small, the luster tends to be too weak with an excessive dimness. On the other hand, if the ratio is too large, the luster tends to be too bright with an excessive brightness.

In particular, an important factor for achieving a polished-metallic surface design which is not excessively specular and shines softly is that the ratio of the diffuse reflection stimulus value Y40° to the specular reflection stimulus value Y45° (Y40°/Y45°) is not excessively small (e.g., not less than 0.007).

TABLE 1

| | | | Test number | | | | |
|---|---|---|---|---|---|---|---|
| | | | 1 | 2 | 3 | 4 | 5 |
| specification | surface roughness of surface layer | Ra (μm) | | | 0.04 | | |
| | | Rmax (μm) | | | 0.52 | | |
| | | Sm (μm) | | | 32.8 | | |
| | stimulus value of metal luster layer | Y45° | | | 102092 | | |
| | lightness of achromatic layer | L* | 5 | 80 | 50 | 25 | 5 |
| | dot size of achromatic layer | average area × $10^4$ (μm$^2$) | 7.1 | | | 2.5 | |
| | dot area percentage of achromatic layer | area percentage (%) | 80 | | | 40 | |
| evaluation of appearance | specular reflection stimulus value | Y45° | 14679 | 52659 | 44557 | 45882 | 40146 |
| | diffuse reflection stimulus value | Y40° | 141 | 577 | 506 | 456 | 462 |
| | stimulus value ratio | Y40°/Y45° | 0.0096 | 0.011 | 0.011 | 0.0099 | 0.012 |

| | | | Test number | | | |
|---|---|---|---|---|---|---|
| | | | 6 | 7 | 8 | 9 |
| specification | surface roughness of surface layer | Ra (μm) | | 0.04 | | |
| | | Rmax (μm) | | 0.52 | | |
| | | Sm (μm) | | 32.8 | | |
| | stimulus value of metal luster layer | Y45° | | 102092 | | |
| | lightness of achromatic layer | L* | | 5 | | |
| | dot size of achromatic layer | average area × $10^4$ (μm$^2$) | 1.8 | 1.1 | 0.8 | 0.1 |
| | dot area percentage of achromatic layer | area percentage (%) | 30 | 20 | | 5 |
| evaluation of appearance | specular reflection stimulus value | Y45° | 59660 | 77072 | 78613 | 91098 |
| | diffuse reflection stimulus value | Y40° | 490 | 574 | 653 | 676 |
| | stimulus value ratio | Y40°/Y45° | 0.0082 | 0.0074 | 0.0083 | 0.0074 |

TABLE 2

| | | | Test number | | | | | | | |
|---|---|---|---|---|---|---|---|---|---|---|
| | | | 10 | 11 | 12 | 13 | 14 | 15 | 16 | 17 |
| specification | surface roughness of surface layer | Ra (μm) | 0.04 | | 0.2 | 0.09 | 0.31 | 0.04 | 0.12 | 0.37 |
| | | Rmax (μm) | 0.52 | | 4.62 | 1.62 | 2.7 | 0.52 | 1.14 | 3.92 |
| | | Sm (μm) | 32.8 | | 605.5 | 194.5 | 81.6 | 32.8 | 32.4 | 501.4 |
| | stimulus value of metal luster layer | Y45° | | | 102092 | | | | 17729 | |
| | lightness of achromatic layer | L* | 5 | — | | 5 | | — | | 5 |
| | dot size of achromatic layer | average area × $10^4$ (μm$^2$) | 0.1 | — | | 0.8 | | — | | 0.1 |
| | dot area percentage of achromatic layer | area percentage (%) | 1 | 0 | | 20 | | 0 | | 5 |

TABLE 2-continued

| | | | Test number | | | | | | |
|---|---|---|---|---|---|---|---|---|---|
| | | | 10 | 11 | 12 | 13 | 14 | 15 | 16 | 17 |
| evaluation of appearance | specular reflection stimulus value | Y45° | 98893 | 102092 | 36271 | 30409 | 3902 | 17729 | 6858 | 1117 |
| | diffuse reflection stimulus value | Y40° | 701 | 578 | 1474 | 1590 | 1849 | 123 | 916 | 926 |
| | stimulus value ratio | Y40°/Y45° | 0.0071 | 0.0057 | 0.041 | 0.052 | 0.47 | 0.0069 | 0.13 | 0.83 |

What is claimed is:

1. A decorative film structure, comprising:
a surface layer constituted by a transparent or translucent resin layer;
an achromatic layer constituted by a plurality of dots provided on a back surface of the surface layer; and
a metal luster layer provided on the back surface of the surface layer to fill a gap between the dots of the achromatic layer, wherein
as surface roughness of a front surface of the surface layer, an arithmetic average roughness Ra is 2 μm or less and either a maximum height Rmax is 4 μm or less or an average concave to convex distance Sm is 50 μm or more,
a lightness L* of the achromatic layer in an L*a*b* colorimetric system is 0-80,
an area of each of the dots when viewed from a front side of the surface layer is $10^{-3}$-$10^5$ μm$^2$,
a dot area percentage per a unit area when viewed from the front side of the surface layer is 1-80%,
a stimulus value Y45° of the metal luster layer, which is a value of Y in tristimulus values of color of an object due to reflection in an XYZ colorimetric system in a case where an illumination optical axis angle is −45°±2° and a received reflected light optical axis angle is 45°±2° with respect to a direction normal to the front surface of the metal luster layer, is 10000 or more, and
the dots of the achromatic layer absorb part of light entering the decorative film structure from the front surface of the surface layer and cause diffuse reflection of part of the light on peripheries of the dots.

2. The decorative film structure of claim 1, wherein as the surface roughness of the front surface of the surface layer, the Ra is 1 μm or less and either the Rmax is 2 μm or less or the Sm is 100 μm or more.

3. The decorative film structure of claim 1, wherein the lightness L* of the achromatic layer is 0-50.

4. The decorative film structure of claim 1, wherein the dot area percentage per the unit area when viewed from the front side of the surface layer is 1-60%.

5. The decorative film structure of claim 1, wherein the stimulus value Y45° of the metal luster layer is 20000 or more.

6. A decorative film structure, comprising:
a surface layer constituted by a transparent or translucent resin layer;
an achromatic layer constituted by a plurality of dots provided on a front surface of the surface layer; and
a metal luster layer provided on a back surface of the surface layer, wherein
as surface roughness of the front surface of the surface layer, an arithmetic average roughness Ra is 2 μm or less and either a maximum height Rmax is 4 μm or less or an average concave to convex distance Sm is 50 μm or more,
a lightness L* of the achromatic layer in an L*a*b* colorimetric system is 0-80,
an area of each of the dots when viewed from a front side of the surface layer is $10^{-3}$-$10^5$ μm$^2$,
a dot area percentage per a unit area when viewed from the front side of the surface layer is 1-80%,
a stimulus value Y45° of the metal luster layer, which is a value of Y in tristimulus values of color of an object due to reflection in an XYZ colorimetric system in a case where an illumination optical axis angle is −45°±2° and a received reflected light optical axis angle is 45°±2° with respect to a direction normal to the front surface of the metal luster layer, is 10000 or more, and
the dots of the achromatic layer absorb part of light entering the decorative film structure from the front surface of the surface layer and cause diffuse reflection of part of the light on peripheries of the dots.

7. The decorative film structure of claim 6, wherein as the surface roughness of the front surface of the surface layer, the Ra is 1 μm or less and either the Rmax is 2 μm or less or the Sm is 100 μm or more.

8. The decorative film structure of claim 6, wherein the lightness L* of achromatic layer is 0-50.

9. The decorative film structure of claim 6, wherein the dot area percentage per the unit area when viewed from the front side of the surface layer is 1-60%.

10. The decorative film structure of claim 6, wherein the stimulus value Y45° of the metal luster layer is 20000 or more.

11. A decorative member, comprising:
a base material; and
a decorative film structure provided on a surface of the base material, wherein
the decorative film structure includes
a surface layer constituted by a transparent or translucent resin layer;
an achromatic layer constituted by a plurality of dots provided on a back surface of the surface layer; and
a metal luster layer provided on the back surface of the surface layer to fill a gap between the dots of the achromatic layer,
as surface roughness of a front surface of the surface layer, an arithmetic average roughness Ra is 2 μm or less and either a maximum height Rmax is 4 μm or less or an average concave to convex distance Sm is 50 μm or more,
a lightness L* of the achromatic layer in an L*a*b* colorimetric system is 0-80,
an area of each of the dots when viewed from a front side of the surface layer is $10^{-3}$-$10^5$ μm$^2$,
a dot area percentage per a unit area when viewed from the front side of the surface layer is 1-80%,
a stimulus value Y45° of the metal luster layer, which is a value of Y in tristimulus values of color of an object due to reflection in an XYZ colorimetric system in a case where an illumination optical axis angle is −45°±2° and a received reflected light optical axis angle is 45°±2° with respect to a direction normal to the front surface of the metal luster layer, is 10000 or more and the dots of the achromatic layer absorb part of light entering the decorative film structure from the front surface of the surface layer and cause diffuse reflection of part of the light on peripheries of the dots.

12. The decorative member of claim 11, wherein the base material is a resin-molded member.

13. A decorative member, comprising:
a base material; and
a decorative film structure provided on a surface of the base material, wherein
the decorative film structure includes
   a surface layer constituted by a transparent or translucent resin layer;
   an achromatic layer constituted by a plurality of dots provided on a front surface of the surface layer; and
   a metal luster layer provided on a back surface of the surface layer,
as surface roughness of the front surface of the surface layer, an arithmetic average roughness Ra is 2 μm or less and either a maximum height Rmax is 4 μm or less or an average concave to convex distance Sm is 50 μm or more, a lightness L* of the achromatic layer in an L*a*b* colorimetric system is 0-80, an area of each of the dots when viewed from a front side of the front surface of the surface layer is $10^{-3}$-$10^{5}$ μm$^2$, a dot area percentage per a unit area when viewed from the front side of the surface layer is 1-80%, and a stimulus value Y45° of the metal luster layer, which is a value of Y in tristimulus values of color of an object due to reflection in an XYZ colorimetric system in a case where an illumination optical axis angle is −45°±2° and a received reflected light optical axis angle is 45°±2° with respect to a direction normal to the front surface of the metal luster layer, is 10000 or more, and the dots of the achromatic layer absorb part of light entering the decorative film structure from the front surface of the surface layer and cause diffuse reflection of part of the light on peripheries of the dots.

14. The decorative member of claim 13, wherein the base material is a resin-molded member.

* * * * *